US012341307B2

(12) United States Patent
Ferrier et al.

(10) Patent No.: US 12,341,307 B2
(45) Date of Patent: Jun. 24, 2025

(54) UNIVERSAL MOBILE DEVICE MOUNT

(71) Applicant: Shopify Inc., Ottawa (CA)

(72) Inventors: Andrew Ferrier, Montreal (CA); Colin Roberts, Ottawa (CA); Michael Joseph Defazio, Fonthill (CA); Silvana Zaldivar, Toronto (CA); Jonathan Kim, Toronto (CA); David Waddell, Nelson (CA)

(73) Assignee: Shopify Inc., Ottawa (CA)

( * ) Notice: Subject to any disclaimer, the term of this patent is extended or adjusted under 35 U.S.C. 154(b) by 366 days.

(21) Appl. No.: 17/857,126

(22) Filed: Jul. 4, 2022

(65) Prior Publication Data

US 2024/0006834 A1    Jan. 4, 2024

(51) Int. Cl.
*H01R 33/94* (2006.01)
*A47F 9/04* (2006.01)
*F16B 2/12* (2006.01)
*H01R 33/74* (2006.01)

(52) U.S. Cl.
CPC ............. *H01R 33/94* (2013.01); *A47F 9/04* (2013.01); *F16B 2/12* (2013.01); *H01R 33/74* (2013.01); *A47F 2009/041* (2013.01); *H01R 2201/06* (2013.01)

(58) Field of Classification Search
CPC .... H01R 33/94; H01R 33/74; H01R 2201/06; A47F 9/04; A47F 2009/041; F16B 2/12; H04M 1/72409; H04M 1/04; F16M 11/041; F16M 11/10; F16M 11/16; F16M 13/00; G06F 1/1626; G06F 1/1632
See application file for complete search history.

(56) References Cited

U.S. PATENT DOCUMENTS

| 9,130,332 | B2 * | 9/2015 | Yosef | H04M 1/04 |
| 9,470,356 | B1 * | 10/2016 | Zaloom | F16M 11/28 |
| 9,924,005 | B1 * | 3/2018 | McElderry | H04M 1/04 |
| 10,401,905 | B2 * | 9/2019 | Carnevali | G06F 1/1626 |
| 2006/0285306 | A1 * | 12/2006 | Carnevali | H04M 1/04 361/759 |
| 2010/0213335 | A1 * | 8/2010 | Peng | B60R 11/02 248/276.1 |
| 2014/0168885 | A1 * | 6/2014 | Williams | G06F 1/1632 361/679.41 |
| 2014/0268544 | A1 * | 9/2014 | Johnson | G06F 1/1632 361/679.44 |

(Continued)

FOREIGN PATENT DOCUMENTS

CN        212115406   * 12/2020  ............. H04M 1/04

*Primary Examiner* — Truc T Nguyen
(74) *Attorney, Agent, or Firm* — Rowand LLP

(57) ABSTRACT

A universal mobile computing device mount comprises a body, a clamp arm, and an insertable electrical connector. The clamp arm is extendible from, and resiliently biased towards, the body, and is configured to engage an edge surface of a mobile computing device. The insertable electrical connector is pivotably mounted in the clamp arm. The electrical connector is pivotable relative to the clamp arm to promote angular alignment of the electrical connector with a complementary electrical receptacle in the edge surface of the mobile computing device during mounting of the mobile computing device into the universal mobile computing device mount.

18 Claims, 15 Drawing Sheets

(56) References Cited

U.S. PATENT DOCUMENTS

| | | | |
|---|---|---|---|
| 2014/0273562 A1* | 9/2014 | Yosef | H04M 1/04 |
| | | | 439/131 |
| 2015/0070835 A1* | 3/2015 | Mclean | G06F 1/1643 |
| | | | 361/679.41 |
| 2015/0148103 A1* | 5/2015 | Samsilova | H04M 1/724092 |
| | | | 439/39 |
| 2015/0201723 A1* | 7/2015 | Rayner | F16M 11/10 |
| | | | 224/191 |
| 2017/0163779 A1* | 6/2017 | Toner | H04M 1/04 |
| 2017/0371374 A1* | 12/2017 | Carnevali | G06F 1/1626 |
| 2019/0353189 A1* | 11/2019 | Saculles | F16M 11/041 |
| 2021/0109426 A1* | 4/2021 | Bei | G03B 17/566 |

* cited by examiner

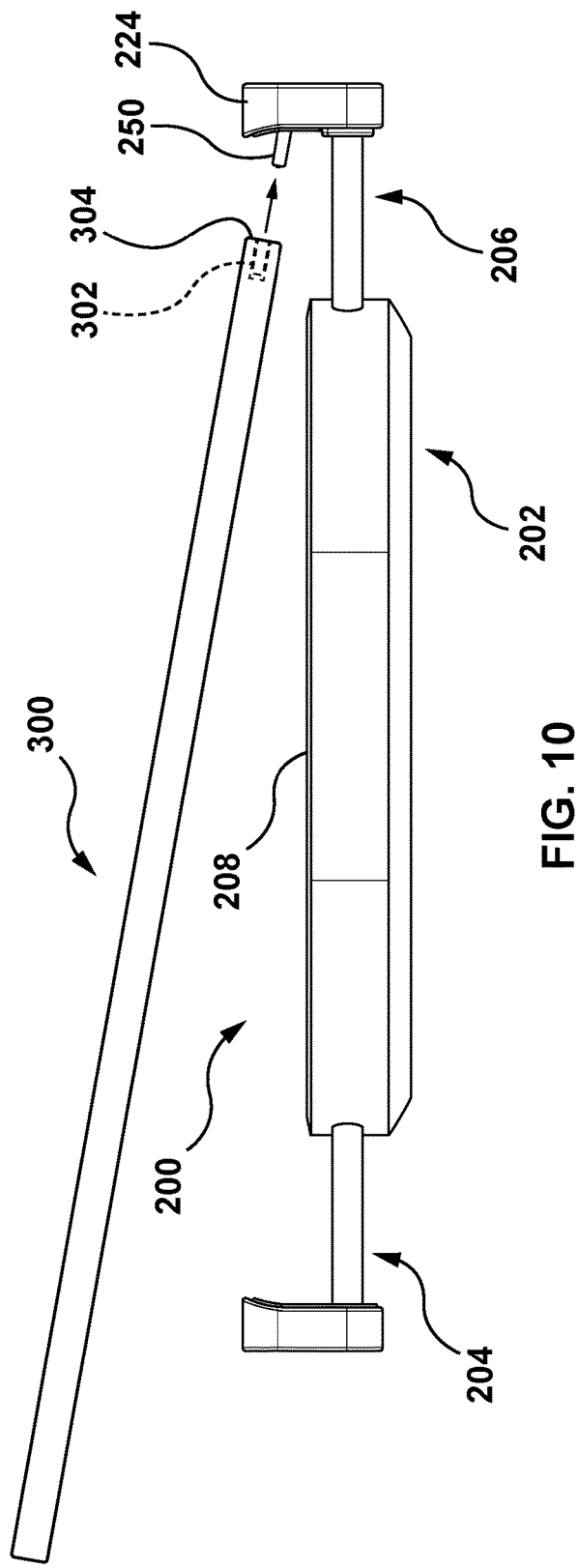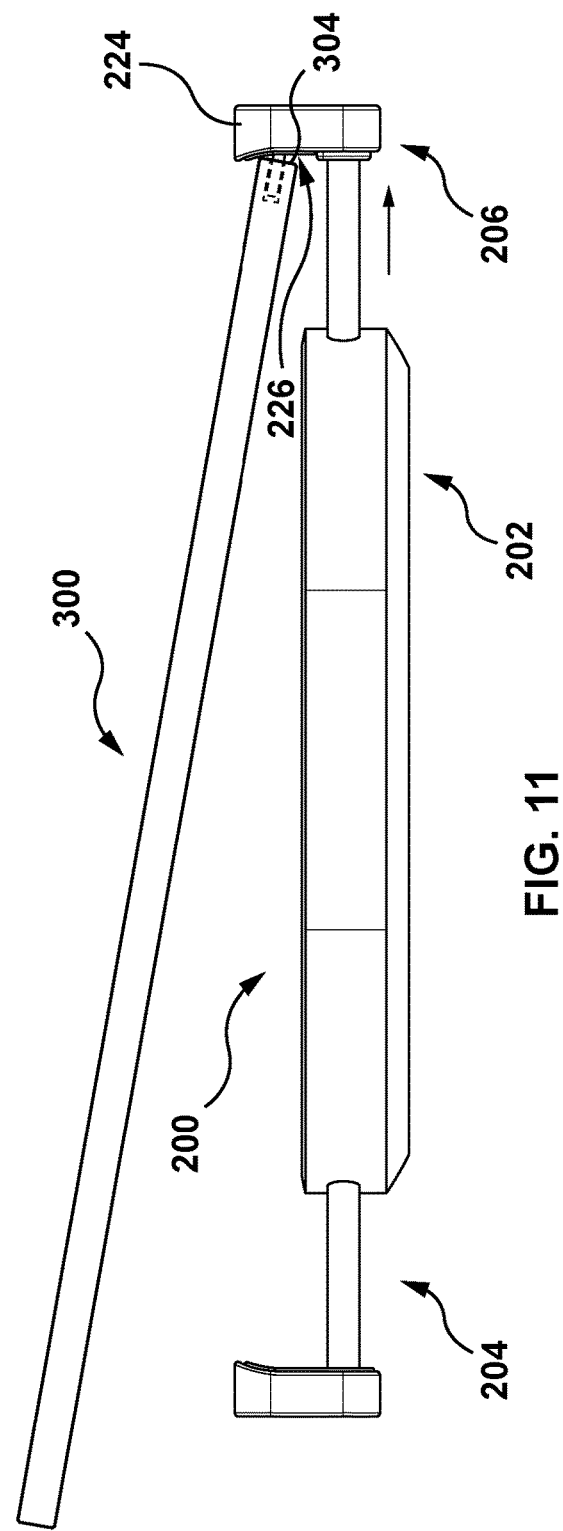

UNIVERSAL MOBILE DEVICE MOUNT

TECHNICAL FIELD

The present disclosure relates to mobile devices, and more particularly to a universal mount for a mobile device.

BACKGROUND

Tablet computing devices ("tablets") and smartphones are examples of mobile computing devices ("mobile devices"). A mobile device may have a slab-like body with a touchscreen display on its front surface. Internal components of the mobile device may include at least one processor, at least one wireless transceiver, and a battery for powering the device. The battery may be rechargeable.

The slab-like shape of a mobile device may be defined in part by four elongate, narrow edge surfaces at the top, bottom, and both sides of the mobile device. These edge surfaces may have, defined therein, at least one electrical receptacle designed to receive a complementary insertable electrical connector. The receptacle may be used to receive power, transmit and/or receive data, or both.

A merchant may use a mobile device, such as a tablet, to interface with a point-of-sale (POS) system, e.g., at a checkout counter of a retail location. The POS system may include a stand upon which the mobile device is placed when not being carried by a salesperson at the retail location. The stand may have an associated electrical cable for supplying power, and possibly data signals, to the mobile device while on the stand. The electrical cable may be terminated by an insertable connector that is compatible with an electrical receptacle of the mobile device.

SUMMARY

A universal mobile computing device mount ("mobile device mount" or simply "mount") can be used to adapt a mobile computing device for convenient seating onto a powered stand. The mobile device mount may be considered as a mobile device adapter that homogenizes different makes and models of slab-like mobile devices—possibly having different lengths, widths, and thicknesses—for use with the same powered stand.

In one aspect of the present disclosure, there is provided a universal mobile computing device mount comprising: a body; a clamp arm extendible from, and resiliently biased towards, the body, the clamp arm configured to engage an edge surface of a mobile computing device; and an insertable electrical connector pivotably mounted in the clamp arm, the electrical connector being pivotable relative to the clamp arm to promote angular alignment of the electrical connector with a complementary electrical receptacle in the edge surface of the mobile computing device during mounting of the mobile computing device into the universal mobile computing device mount.

In some embodiments, the electrical connector is configured to have a default inclination relative to the body when no mobile computing device is mounted in the mobile computing device mount.

In some embodiments, the universal mobile computing device mount further comprises a cavity in the clamp arm within which the electrical connector is pivotably mounted to the clamp arm, the cavity being configured to permit limited translation of the electrical connector relative to the clamp arm in a translation dimension.

In some embodiments, the translation dimension is orthogonal to both an axis of pivotability of the electrical connector and a direction of biasing of the clamp arm towards the body.

In some embodiments, the universal mobile computing device mount further comprises a connector base integrally formed with the electrical connector, the connector base comprising a body and a coaxial pair of shoulder nubs protruding from either side of the body of the connector base, the connector base being sized to fit within the cavity; and a pair of supports at opposite sides of the cavity in the clamp arm, the pair of supports being usable as a fulcrum for pivotably engaging the pair of shoulder nubs during the pivoting of the electrical connector relative to the clamp arm.

In some embodiments, the body of the connector base is tapered away from the shoulder nubs.

In some embodiments, the universal mobile computing device mount further comprises a set of electrical contacts in the body for relaying electrical signals between the mobile computing device and a powered stand; and at least one electrical conductor electrically coupling the set of electrical contacts in the body with the electrical connector in the clamp arm.

In some embodiments, a portion of the at least one electrical conductor is tucked into an open channel in the clamp arm.

In some embodiments, a portion of the at least one electrical conductor is threaded through a hollow internal passage of the clamp arm.

In some embodiments, the at least one electrical conductor is fully enclosed by the body and the clamp arm collectively.

In some embodiments, the at least one electrical conductor comprises a cable and the universal mobile computing device mount further comprises a first cable anchor configured to fix a first portion of the cable to the body; a second cable anchor configured to fix a second portion of the cable to the clamp arm; and a hollow within the body for accommodating slack in the cable between the first and second portions of the cable when fixed by the first and second cable anchors respectively, and the slack in the cable is sufficient for unrestricted movement of the clamp arm, relative to the body, between a default retracted position of the clamp arm and an extended position of the clamp arm.

In some embodiments, each of the first and second cable anchors is a cable crimping channel.

In some embodiments, the cable crimping channel has opposed, offset, inwardly pointing teeth.

In some embodiments, the clamp arm is a first clamp arm, the edge surface of the mobile computing device is a first edge surface, and the universal mobile computing device mount further comprises a second clamp arm extendible from, and resiliently biased towards, the body, the second clamp arm being located on an opposite side of the body as the first clamp arm, the second clamp arm being configured to engage a second edge surface of the mobile computing device, the second edge surface being opposite from the first edge surface of the mobile computing device.

In some embodiments, the first clamp arm includes first resilient biasing means, the second clamp arm includes second resilient biasing means, and the first and second resilient biasing means are substantially equal, so that the first and second clamps arms will collectively substantially center a mounted mobile computing device relative to the body.

In some embodiments, the insertable connector is a Universal Serial Bus type C connector.

BRIEF DESCRIPTION OF THE DRAWINGS

In the figures which illustrate example embodiments,

FIGS. 10, 11, 12, 13, and 14 are side elevation views of the mobile device mount of FIG. 1 during various stages of mounting of an example mobile device;

DESCRIPTION

In this document, any use of the term "exemplary" should be understood to mean "an example of" and not necessarily to mean that the example is preferable or optimal in some way. Terms such as "bottom," "top," "side," "lower," "downwardly," "rear," and "front" may be used to describe features of some embodiments in this description but should not be understood to necessarily connote an orientation of the embodiments during manufacture or use.

Figure 1:
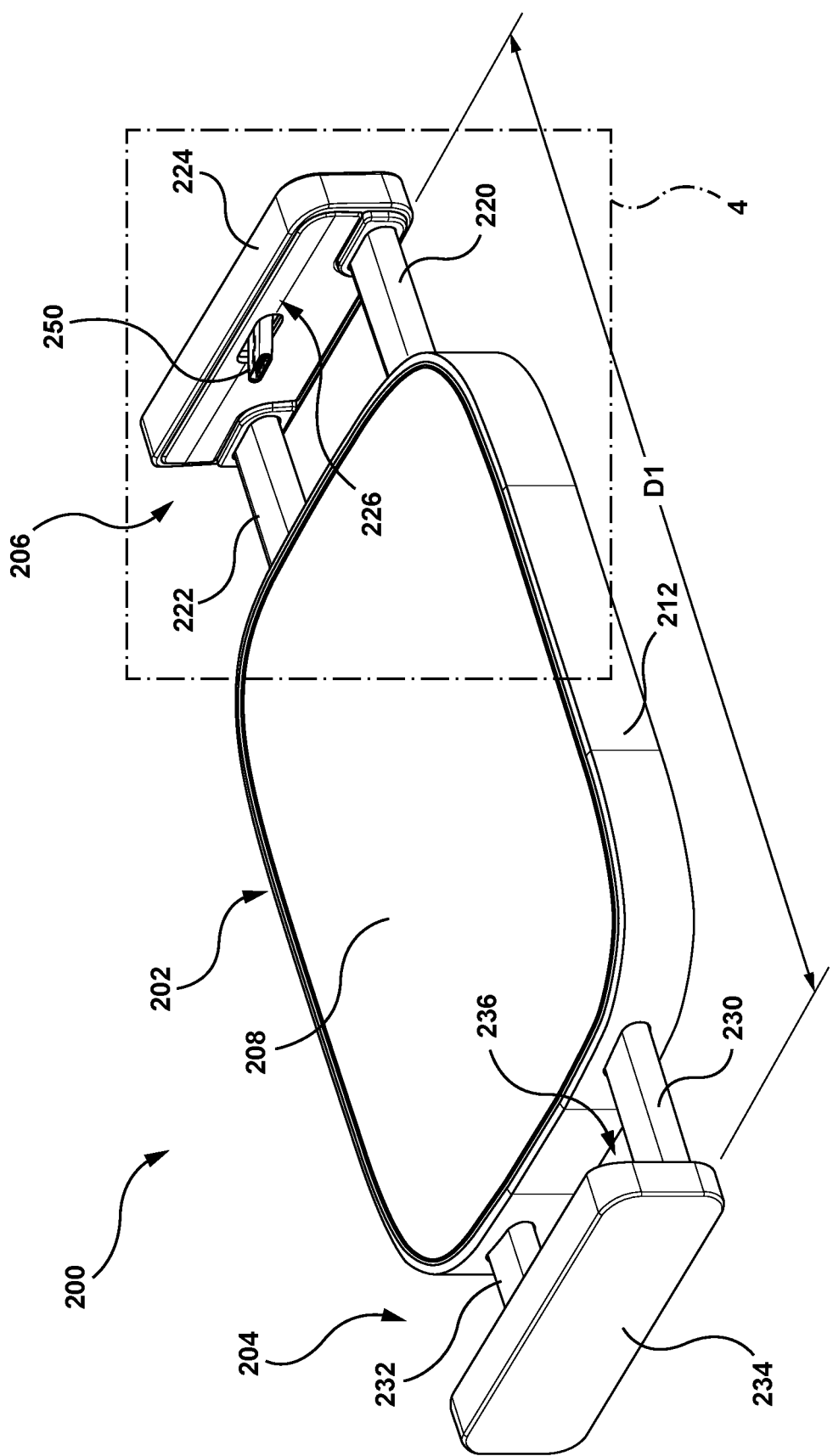
FIG. 1 is a top perspective view of an example embodiment of mobile device mount.
Figure 2:
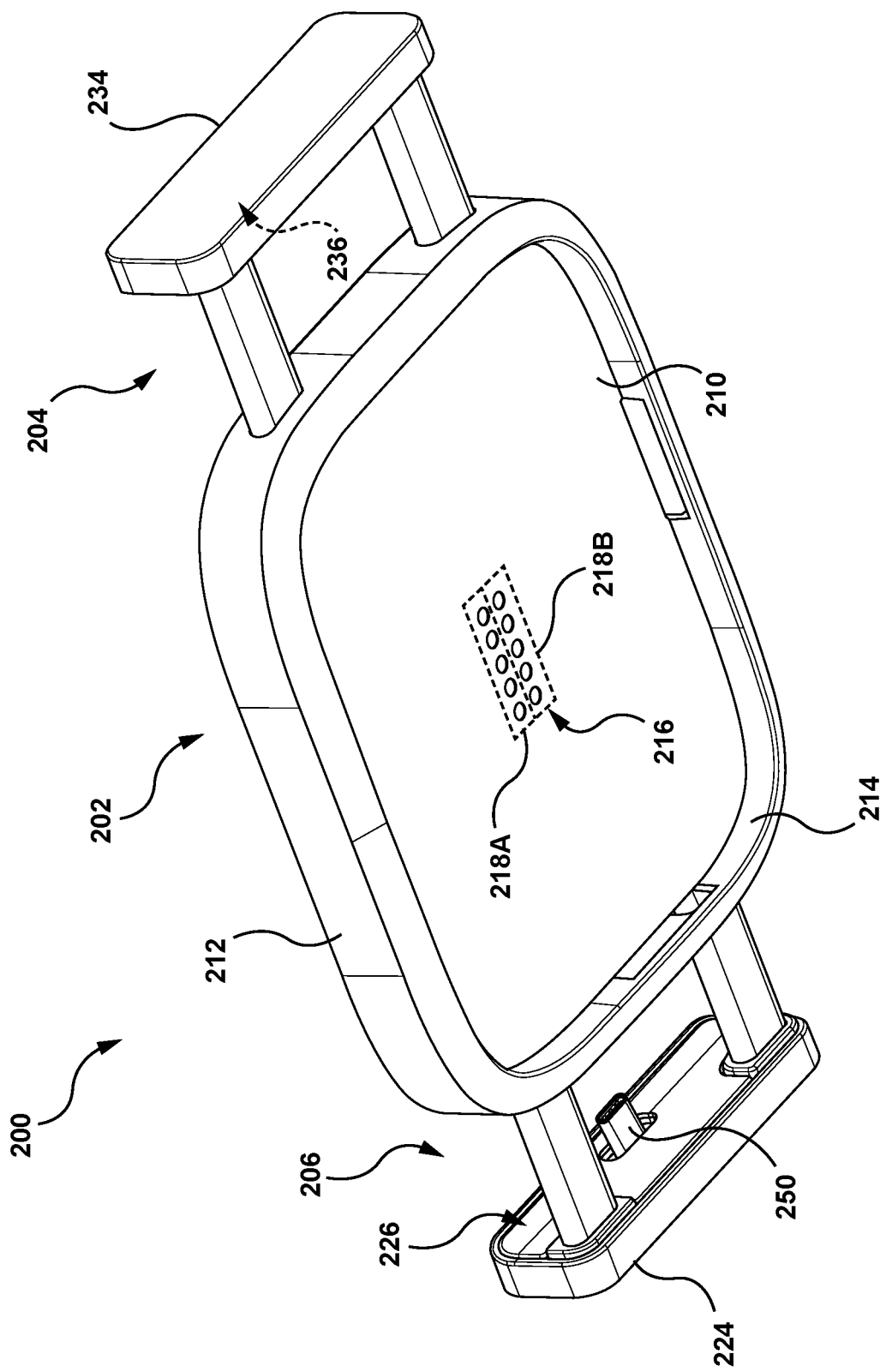
FIG. 2 is a bottom perspective view of the mobile device mount of FIG. 1.

FIGS. 1 and 2 are top and bottom perspective views, respectively, of an example embodiment of a universal mobile computing device mount 200 (or "mobile device mount" 200). The depicted mobile device mount 200 has a body 202 and two opposed, extendible clamp arms 204, 206 protruding from opposite sides of the body 202 respectively.

The body 202 of the example mobile device mount 200 has a flattened cuboid shape with rounded corners. The top 208 and the bottom 210 (FIG. 2) of the body 202 are both generally flat, although this is not strictly required.

As best seen in FIG. 2, the bottom 210 of body 202 is recessed with respect to the surrounding wall 212 in the present embodiment. The lower portion of the wall 212 accordingly forms a downwardly protruding peripheral lip 214 about the bottom 210 of the body 202. As will become apparent, the lip 214 may facilitate alignment with a mating surface of a powered stand when the mobile device mount 200 is being seated thereupon.

A set of electrical contacts 216 (FIG. 2) is centrally disposed on the bottom 210 of the body 202. The purpose of the contacts 216 is to relay power and, optionally, data signals between a mounted mobile device and the powered stand. In the present embodiment, the set of contacts 216 is arranged in two rows 218A, 218B of five contacts each. The rationale for this arrangement will be described below.

Each extendible clamp arm 204, 206 is resiliently biased inwardly towards the body 202. As will be described, the clamp arms 204, 206 cooperate to clamp therebetween a slab-like mobile computing device placed atop body 202.

Figure 14:
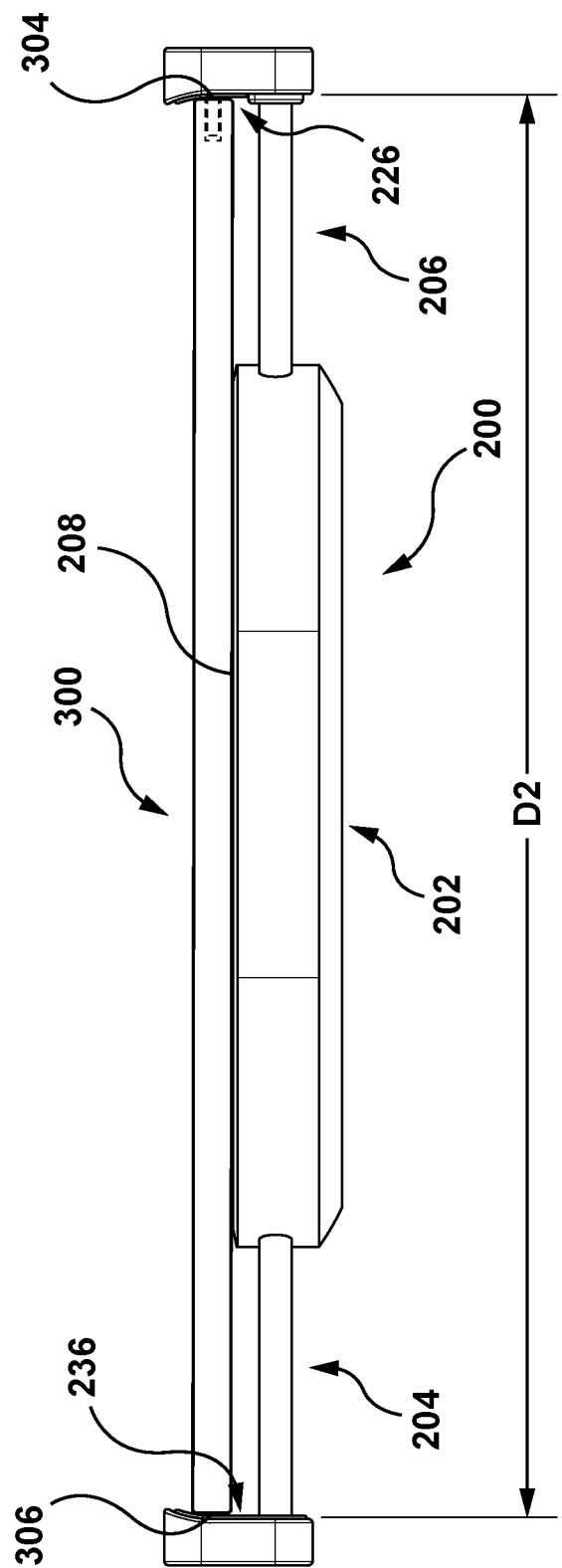

The first clamp arm 204 is formed from two parallel, rigid arm members 220, 222 terminated by a perpendicular crosspiece 224 (FIG. 1). The crosspiece 224 rigidly interconnects the distal ends of arm members 220, 222. Collectively, the arm members 220, 222 and the crosspiece 224 define a shape similar to the Greek letter 'pi.' The other clamp arm 206 has a similar structure and shape, also being formed from two parallel, rigid arm members 230, 232 terminated by a perpendicular crosspiece 234. Each of the crosspieces 224, 234 defines a respective inwardly facing clamping surface 226, 236 for engaging an edge surface of a mounted mobile device, e.g., as shown in FIG. 14 (described below). The clamp arms of alternative embodiments may have different structures and shapes.

Figure 3:
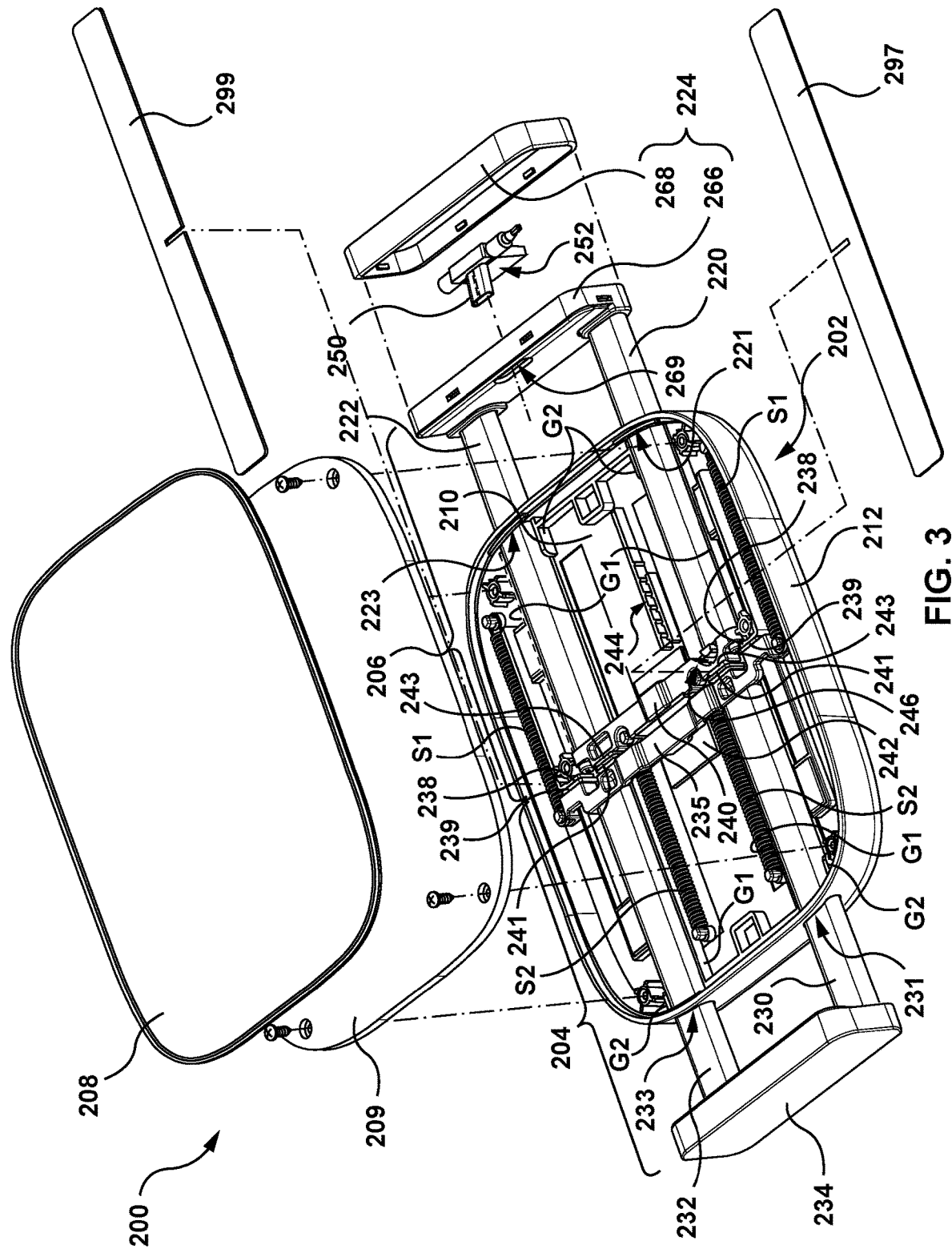
FIG. 3 is an exploded view of the mobile device mount of FIG. 1.

FIG. 3 is an exploded view of the mobile device mount 200 with the top 208 and an inner cover 209 of body 202 removed to reveal internal components housed therewithin. As illustrated, the arm members 220, 222, 230, and 232 are slidably received through respective holes 221, 223, 231, and 233 in the wall 212 of body 202, with most of the length of each arm member 220, 222, 230, and 232 being internal to the body in FIG. 3.

In FIGS. 1-3, the clamp arms 204, 206 are in a retracted state, which is their default state when the mobile device mount 200 is empty, i.e., when no mobile device is mounted in the mobile device mount 200. In that state, each clamp arm 204 and 206 is inwardly resiliently biased against a respective stop.

In the case of clamp arm 204, inward biasing is achieved by a pair of coil springs S1 (a form of resilient biasing means). The two springs S1 are attached to respective ends of an internal, perpendicular crosspiece 235 rigidly interconnecting proximal ends of arm members 230 and 232. These springs S1 bias crosspiece 235—and thus the clamp arm 204 generally—against a stop 238. In the present embodiment, the stop 238 takes the form of a spaced apart pair of upstanding ribs, upstanding from the floor 203 of the body 202, which are perhaps best seen in FIG. 3A (described below). To dampen impact and reduce sound, resilient bumpers 239 (e.g., foam strips—see FIG. 3) are attached to the crosspiece 235 facing, and in alignment with, the ribs collectively forming stop 238.

In the case of clamp arm 206, inward biasing is similarly achieved by another pair of coil springs S2, each of which is also attached to an internal, perpendicular crosspiece 240 rigidly interconnecting the proximal ends of arm members 220 and 222. The springs S2 bias crosspiece 240—and thus the clamp arm 206 generally—against a stop 241. In the present embodiment, the stop 241 takes the form of a spaced apart pair of ribs or tabs, upstanding from the floor 203 of the body 202, which are perhaps best seen in FIG. 3A (described below). To dampen impact and reduce sound, a resilient bumper 243 (e.g., a foam strip) is attached to the crosspiece 240 facing, and in alignment with, each of the ribs collectively comprising the stop 241. The respective spring constant of each of the pairs of springs S1 and S2 is substantially equal in the present embodiment, for reasons that will become apparent.

When the clamp arms 204 and 206 are in their default retracted state of FIGS. 1-3, their respective crosspieces 224 and 234 are laterally separated by a distance D1 (see FIG. 1). D1 may be less than a minimum length of the mobile device(s) that the mobile device mount 200 is intended to carry.

Referring again to FIG. 3, a respective pair of guides G1 and G2 inside body 202 flanks each of the four arm members 220, 222, 230, and 232. The arm members 220, 222, 230, and 232 slidably engage the guides G1 and G2 during extension or retraction (translation) of clamp arms 204 and 206 relative to body 202.

Figure 3A:
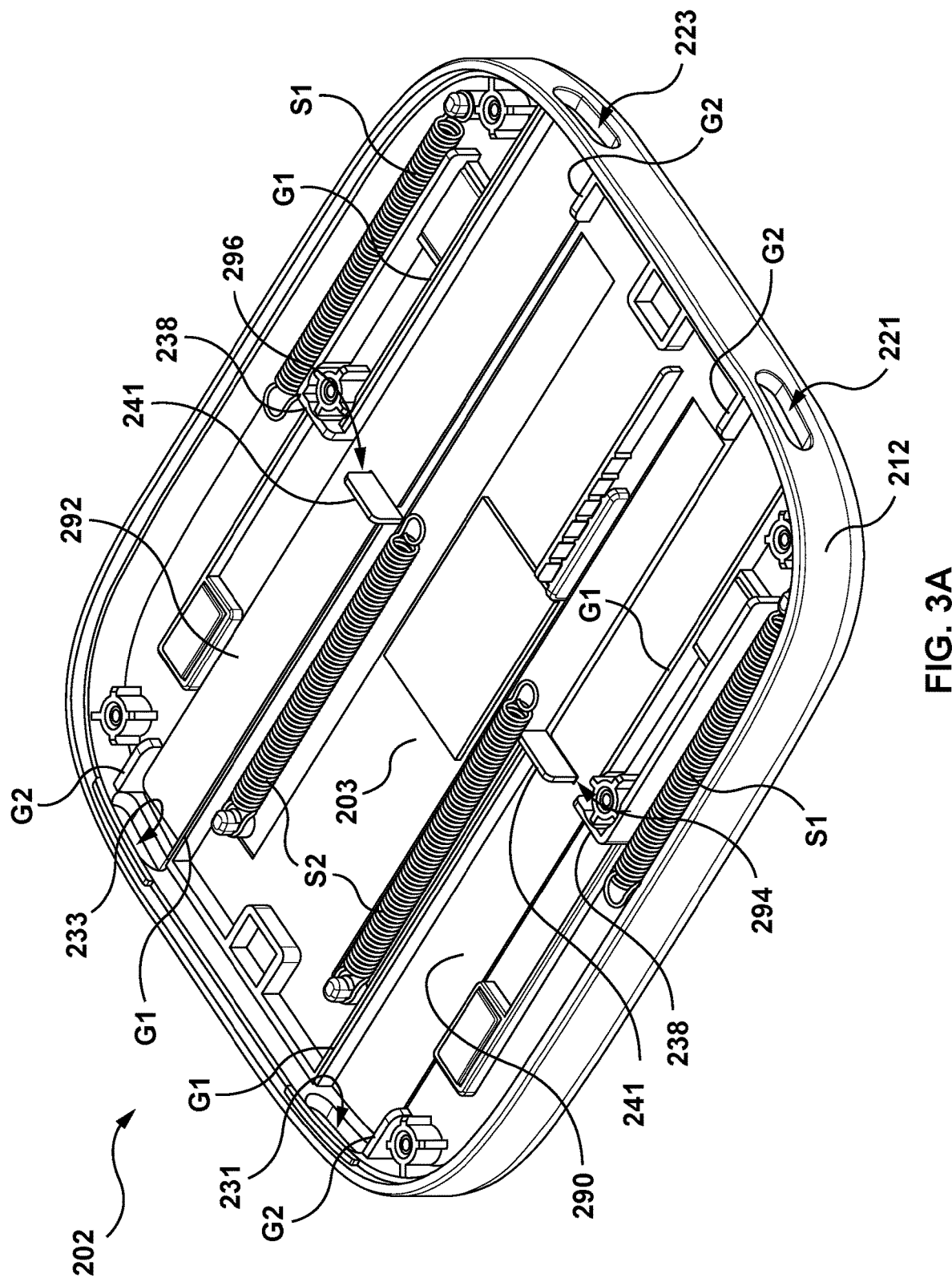
FIG. 3A is a perspective view of a body portion of the mobile device mount of FIG. 1 in isolation.

FIG. 3A is a perspective view of the body portion 202 of the mobile device mount 200 with top 208, inner cover 209, and clamp arms 204 and 206 omitted. As illustrated, the body 202 includes a lower pair of low-friction and/or wear-resistant strips (or sheets) 290 and 292 that lie atop the floor 203 of the body 202. The strips may for example be TEFLON™ MYLAR™ strips. The strips 290, 292 may promote smooth movement, and may minimize wear, of the arm members 220 and 222 of clamp arm 204, and arm members 230 and 232 of clamp arm 206, which are slidable atop strips 290, 292 during movement of each clamp arm 204 and 206 between a retracted position and an extended position.

In the present embodiment, each of the depicted low-friction and/or wear-resistant strips 290, 292 is elongate and substantially rectangular. The first strip 290 extends between opposed holes 221, 231 in wall 212, fitting between guides G1 and G2. The second strip 292 extends between opposed holes 223, 233 in wall 212, similarly fitting between guides G1 and G2. Each strip 290, 292 has a respective notch 294, 296 that engages a respective portion of stop 241. The engagements limits movement of the strips 290, 292 upon extension or retraction of the clamp arms 204 and 206.

Referring again to FIG. 3, another, upper pair of low-friction and/or wear-resistant strips (or sheets) 297 and 299, similar to the strips 290 and 292 described above, are placed atop the arm members 220, 222, 230, and 232. The upper strips 297, 299 are similarly notched, with the notches engaging with respective portions of stop 241 to limit movement of the strips 297, 299 with respect to clamp arms 204 and 206. The arm members 220 and 230 are accordingly disposed between strips 290 and 297 of the assembled mobile device mount 200. Similarly, arm members 222 and 232 are disposed between strips 292 and 299 of the assembled mobile device mount 200.

Other internal components of the body 202 visible in FIG. 3 include a printed circuit board (PCB) 242 and cable anchors 244 and 246. The PCB 242 is centrally mounted to the floor 203 of the body 202 (i.e., to the inner surface of the bottom 210) and is electrically coupled to the electrical contacts 216 (FIG. 2). The cable anchors 244 and 246 are for a cable that is omitted in FIG. 3 but is described below in connection with FIG. 9.

Figure 4:
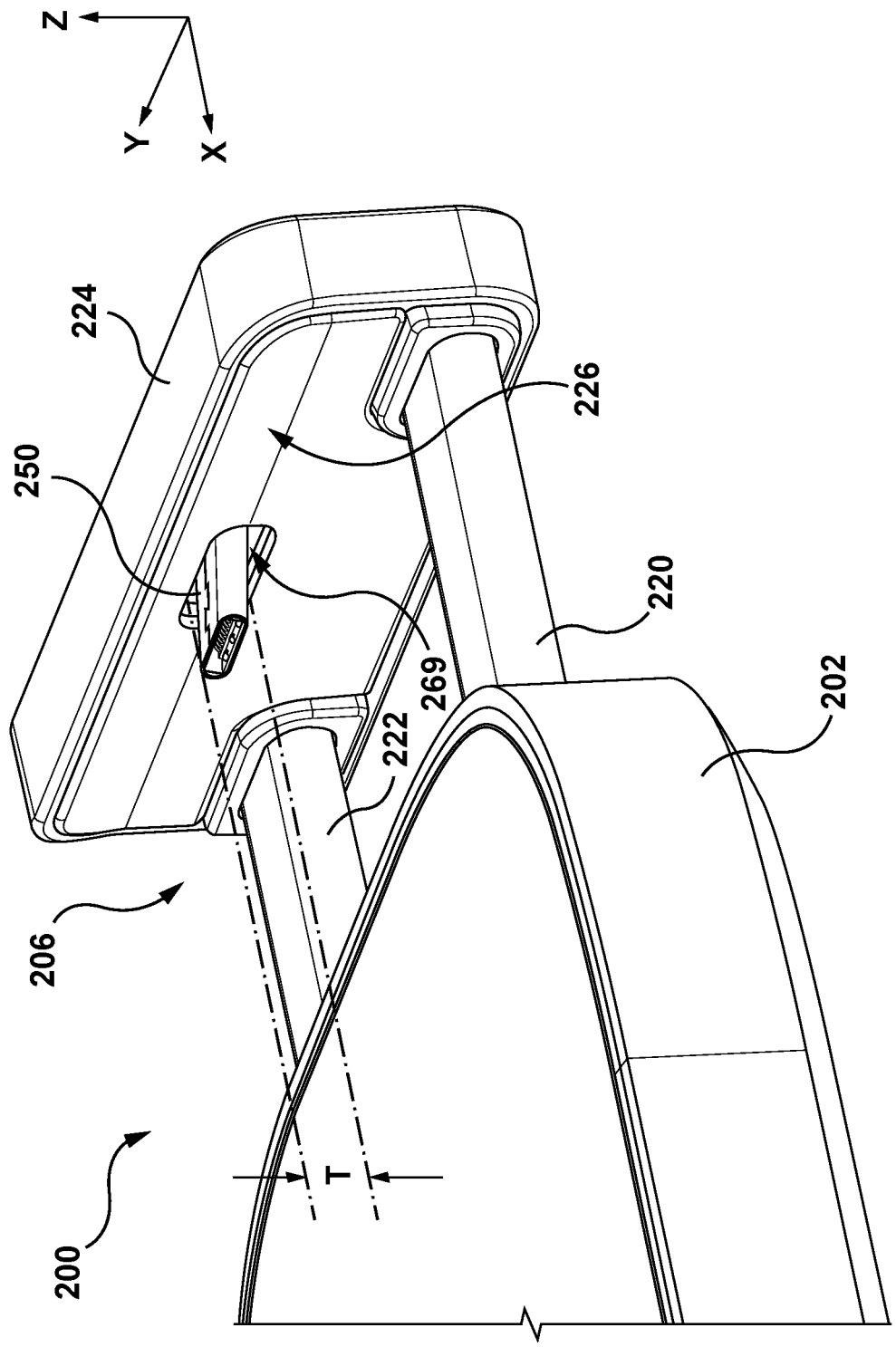
FIG. 4 is an enlarged perspective view of a clamp arm of the mobile device mount of FIG. 1.
Figure 5:
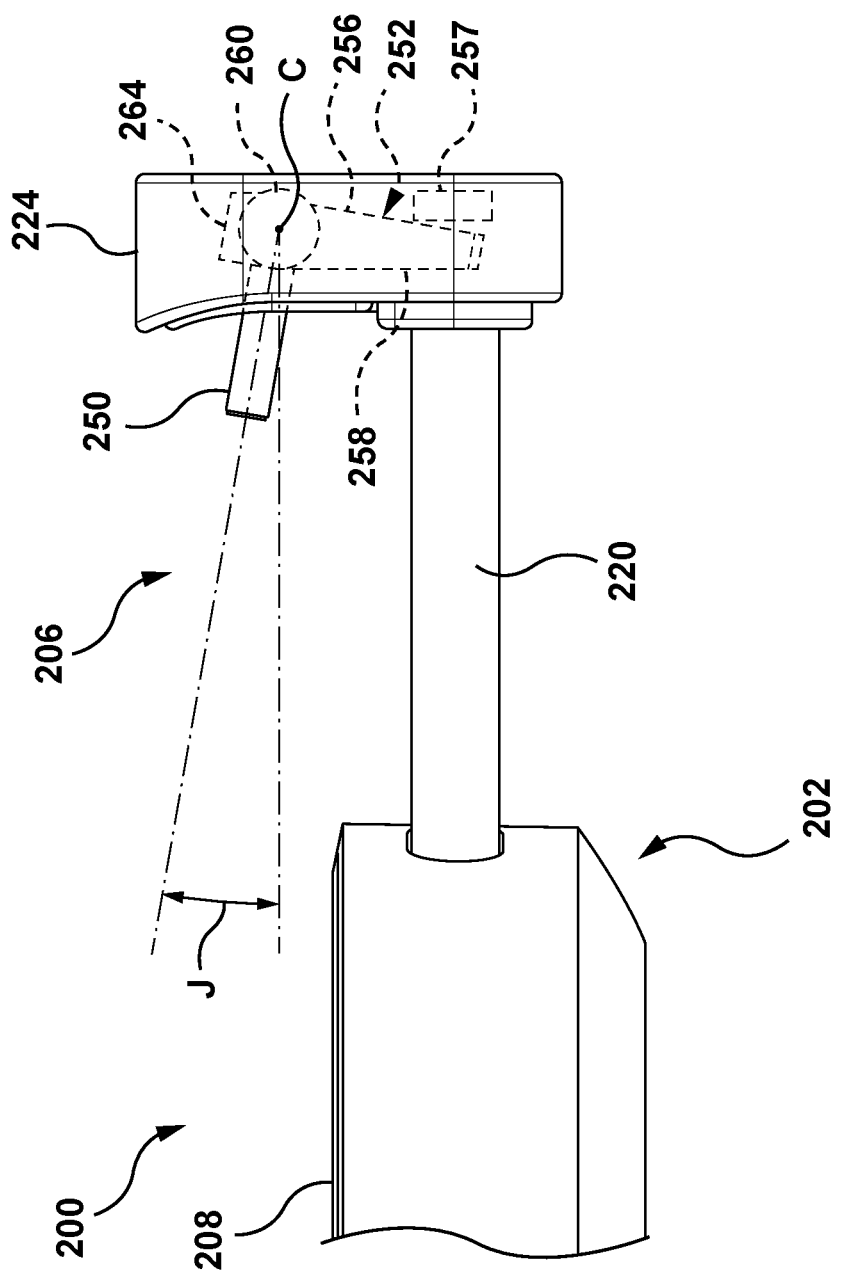
FIG. 5 is front elevation view of the clamp arm of FIG. 4.

Referring to FIGS. 4 and 5, the clamp arm 206 is depicted in close-up, perspective view and in front elevation view, respectively. An insertable (male) electrical connector 250 is pivotably mounted in the clamp arm 206. In the illustrated embodiment, the electrical connector 250 is a Universal Serial Bus Type C (USB-C) connector. However, alternative embodiments of mobile device mount may use other types of insertable electrical connectors, e.g., such as USB-A or Lightning™ connectors.

In the present embodiment, the electrical connector 250 is mounted in the crosspiece 224 at clamping surface 226. The electrical connector 250 is oriented to protrude from the crosspiece 224 of clamp arm 206 towards the body 202.

When the mobile device mount 200 is empty as in FIGS. 1-5, the electrical connector 250 naturally assumes an inclined angular orientation of J degrees inclined with respect to the body 202 (e.g., with respect to the horizontal top 208 as in FIG. 5). In some embodiments, J may be approximately 10 degrees. The rationale for this default inclination of the electrical connector 250 will become apparent from the description below of the mounting of an example mobile device into the mobile device mount 200. The electrical connector 250 is pivotable about axis C from the default inclination to horizontal in FIG. 5, i.e., level relative to body 202.

In the present embodiment, the electrical connector 250 is integrally formed with a connector base 252, which is depicted in FIG. 5 in dashed lines. The connector base 252 is also visible in the exploded view of FIG. 3 and is shown in the enlarged perspective view of FIG. 6.

Figure 6:
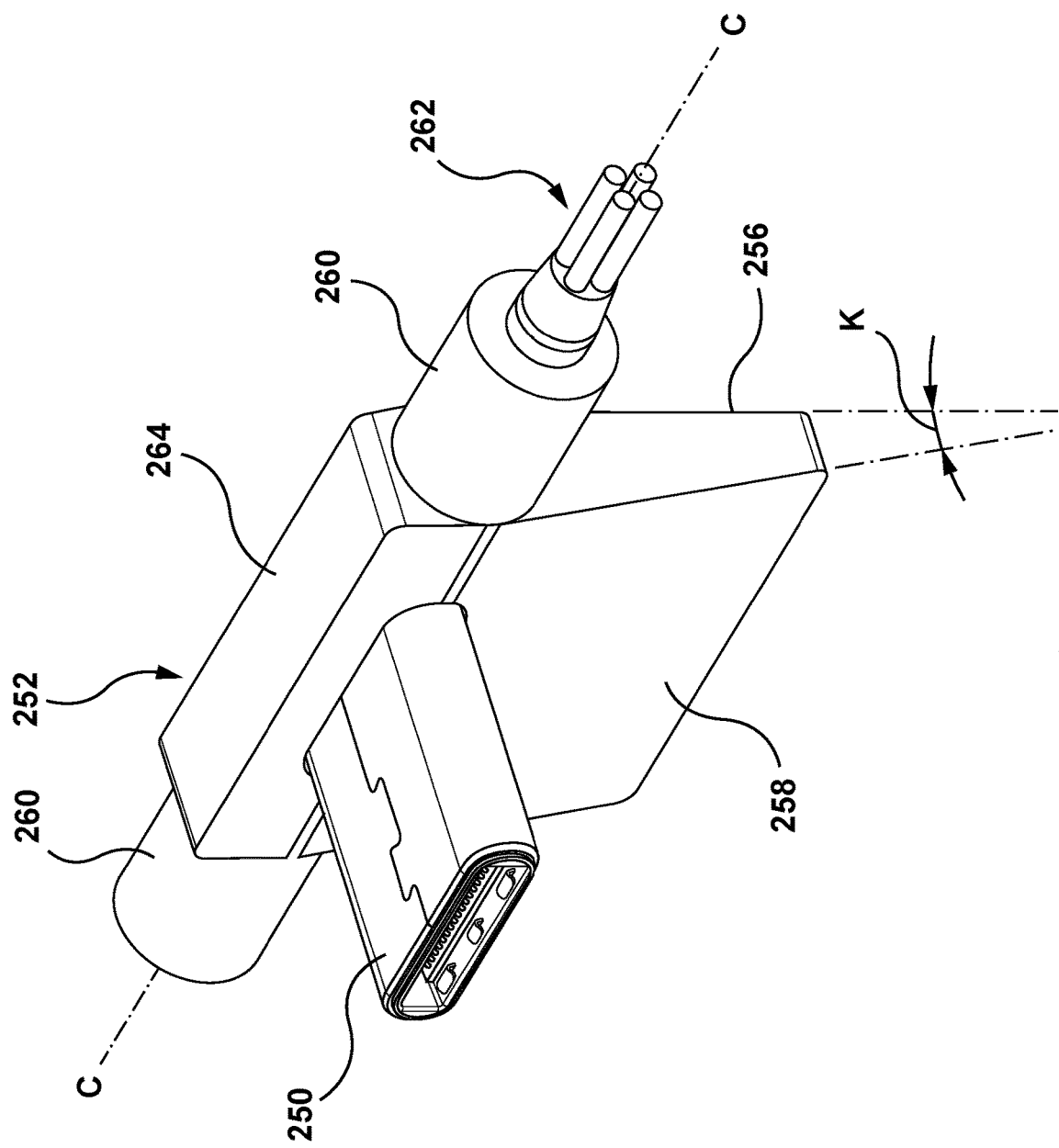
FIG. 6 is a perspective view of an electrical connector and integral connector base component of the mobile device mount of FIG. 1 in isolation.

FIG. 6 depicts the electrical connector 250 and integral connector base 252 in isolation. In the present embodiment, the connector base 252 has a generally wedge-shaped body 264 that is defined in part by flat rear wall 256 and flat front wall 258. The body 264 is tapered away from shoulder nubs 260 (described below), i.e., the front wall 258 is slanted inwardly relative to the rear wall 256. In some embodiments, the angle of the taper in FIG. 6 may match the desired angle of inclination J (see FIG. 5) of the electrical connector 250 when the mobile device mount 200 is empty.

Two shoulder nubs 260 protrude laterally on opposite sides of the body 264. In the present embodiment, the nubs 260 are cylindrically shaped, of like size, and coaxial with common axis C. In the depicted embodiment, a cable 262 is mounted to one of the shoulder nubs 260. The cable 262 includes multiple insulated conductors for carrying power and/or data signals. Within the body 264, the cable is electrically coupled to the electrical connector 250. In an alternative embodiment, the cable 262 could be mounted directly to the body 264, e.g., below the shoulder nubs 260. In either case, the length of cable 262 will be sufficient to permit the connector base 252 to pivot through an inclination from horizontal, e.g., as shown in FIG. 5 for example.

In some embodiments, resilient (e.g., foam) inserts may be used to limit rattling of the connector 250 and/or connector base 252 within the cavity 267. For example, two resilient inserts, each adjacent to a respective end of the body 264 (one at the widest and the other at the narrowest end), may sandwich the connector base 252 within the cavity 267, collectively filling most or all the cavity 267. The resilient inserts may be sufficiently collapsible to permit translation T of electrical connector 250 as shown in FIG. 4. In some embodiments, the resilient inserts may be shaped to hold the connector base 252 with the electrical connector 250 at the desired angle of inclination J when the mobile device mount 200 is empty.

The connector base 252 is designed to be mounted to the clamp arm 206 within a cavity 267 formed in the crosspiece 224 of the clamp arm 206. The cavity 267 is defined by two components collectively comprising the crosspiece 224: a frame member 266 and a cap member 268 (see FIG. 3).

Figure 7:
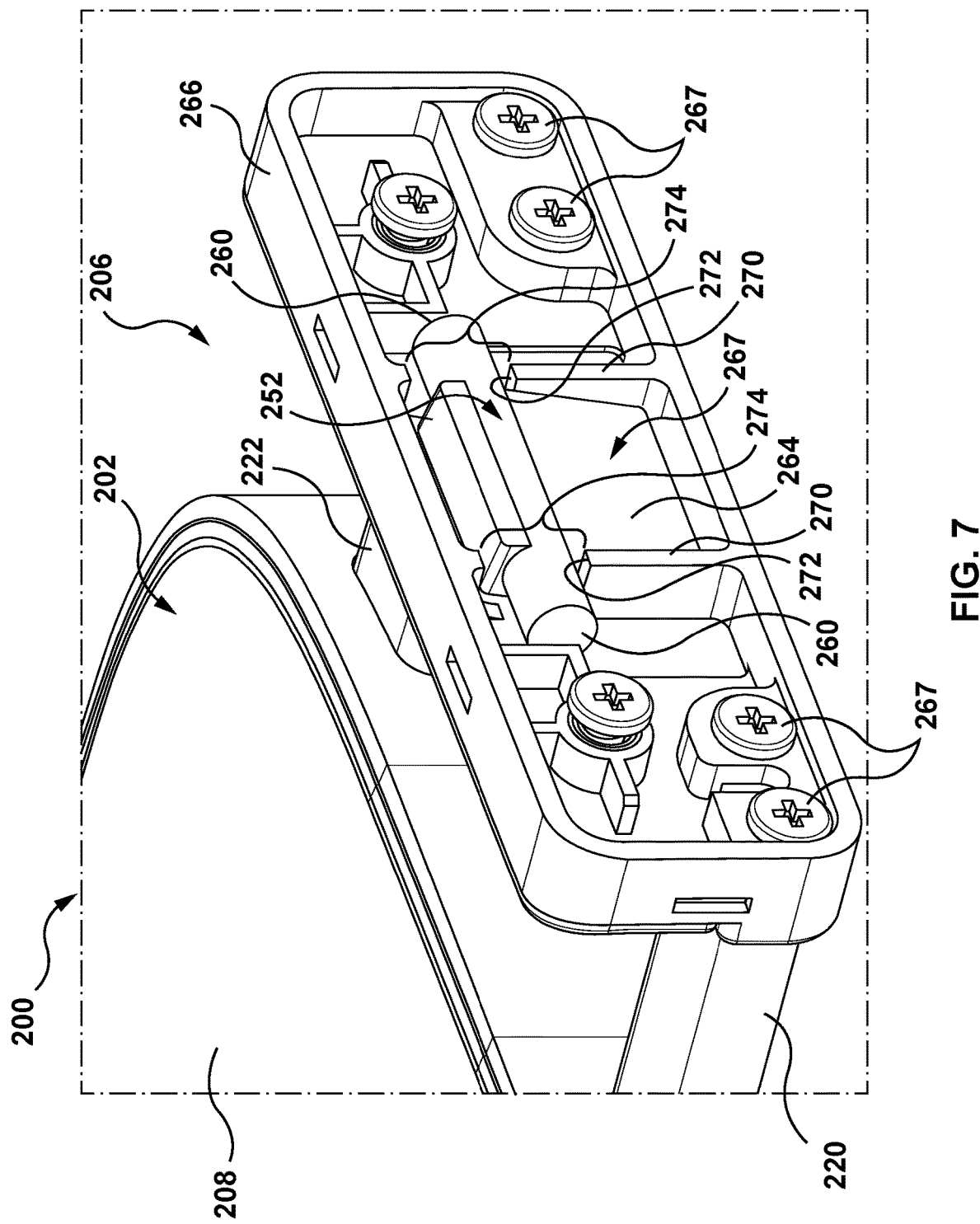
FIG. 7 is a perspective view of the clamp arm of FIG. 4 with a cap member component having been removed.

FIG. 7 is a perspective view of the clamp arm 206 with the cap member 268 of crosspiece 224 removed to reveal frame member 266. For clarity, the cable 262 is omitted from FIG. 7. In the present embodiment, the frame member 266 is attached to the distal ends of the arm members 220, 222 using removable fasteners 267, specifically screws.

The frame member 266 defines various recesses and hollows, e.g., to create passages for routing the cable 262. A cavity 267 is partly defined by two upstanding ribs 270, which can be seen in FIG. 7 flanking the body 264 of the connector base 252. Each rib 270 has a gap 274 defined therein. In the present embodiment, each gap 274 is configured to accommodate a respective one of the shoulder nubs 260 of the connector base 252. In some embodiments, the nubs 260 may be positioned approximately mid-way within the gaps when the mobile device mount 200 is empty, as depicted in FIG. 7. This positioning may for example be achieved using resilient inserts sandwiching the connector base 252 within the cavity 267, as described above. In some embodiments, these surfaces 272 may act as a fulcrum for pivotably engaging the pair of shoulder nubs 260 during the pivoting of the electrical connector 250 relative to the clamp arm 206. In such embodiments, the lower portions of the ribs 270 may be considered as supports for that purpose. Such supports could take other forms in alternative embodiments, e.g., recesses in a pair of walls, each recess for pivotably receiving a respective one of the shoulder nubs 260.

In some embodiments, the default inclination of the electrical connector 250, as shown in FIG. 5, may be achieved by a suitable "counterbalance" weight distribution within the connector base 252 and the operation of gravity. For example, a heavier weighting at or near the rear wall 256 of body 254 may cause the connector base 252 to pivot generally about transverse axis C in the clockwise direction as viewed in FIG. 5. Pivoting may be arrested when the front wall 258 of the connector base 252 abuts a vertical inner surface (not expressly depicted) of the wall of the frame member 266 (part of crosspiece 224), at which point the desired inclination of J degrees may be achieved. A possible trade-off of this approach is that the inclination angle J may vary if the mobile device mount 200 is inclined as it is being manipulated.

In some embodiments, the default inclination of the electrical connector 250 may be achieved using a resilient biasing element to act against one or more surfaces of connector base 252. For example, a resilient biasing element 257 may be situated between a wall of cap member 268 and the rear wall 256 of body 254 so as to act upon the rear wall 256 (see FIG. 5). The resilient biasing element 257 may for example be a spring, such as a coil spring or a leaf spring, or a piece of resilient foam. Alternatively, a torsional biasing element may be used to act upon one or both nubs 260 to induce the default inclination of the electrical connector 250. In a further alternative, the default inclination could be induced by one or more magnets. The magnet(s) could be used to repel a portion of the connector base 252. The magnet(s) could also be used to attract another portion of the connector base 252 or the electrical connector 250.

Referring to FIG. 3, the cap member 268 is sized to mate snugly with the frame member 266 to collectively form crosspiece 224, e.g., by way of a friction fit and/or snapping into place. When these two components are mated, the connector base 252 will be enclosed within the cavity 267. A distal portion of the electrical connector 250 will protrude through a hole 269 in the clamping surface 226 of the clamp arm 206, which hole 269 is defined in the frame member 266 of the present embodiment (as shown, e.g., in FIG. 4).

Figure 8B:
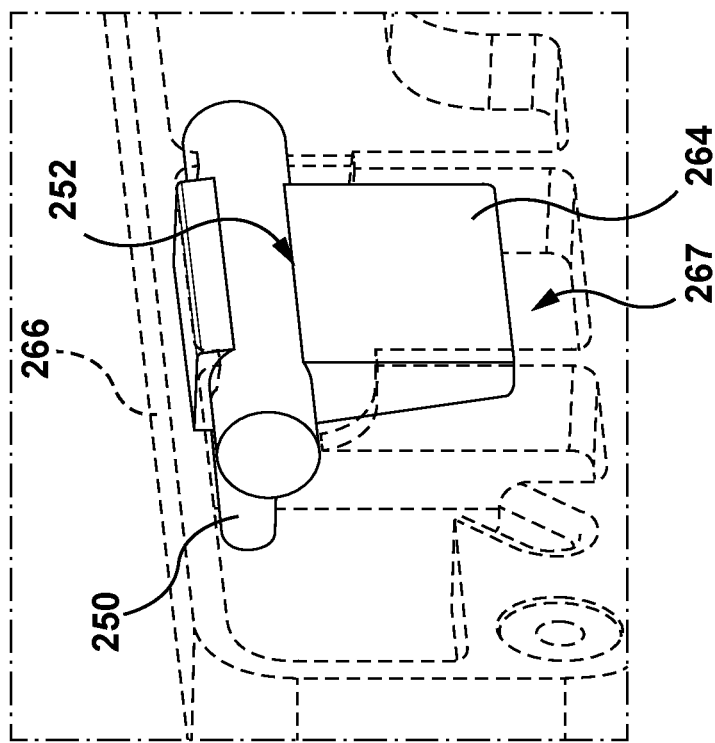
FIGS. 8A and 8B are perspective views showing two positions of an electrical connector and integral connector base relative to the clamp arm of FIG. 7.
Figure 8A:
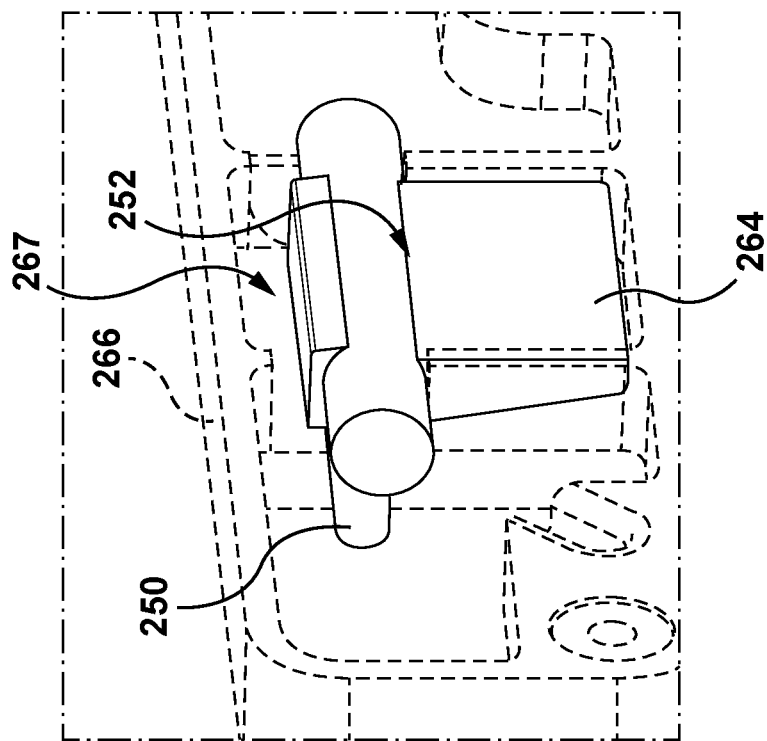

In the present embodiment, the electrical connector 250 (together with connector base 252) is translatable in the Z dimension, i.e., vertically in FIG. 4, to a limited extent T. For clarity, the translatability dimension Z is orthogonal to both an axis of pivotability of the electrical connector 250 (i.e., axis C of FIG. 6, which is oriented in the Y dimension of FIG. 4) and a direction of biasing of the clamp arm towards the body (i.e., the X dimension of FIG. 4), where the X, Y, and Z dimensions are mutually orthogonal with respect to one another. The limited translatability is achieved in the present embodiment by appropriate relative sizing, in the Z dimension, of certain features, including: sizing the cavity 267 to be larger than the connector base 252; sizing of the gaps 274 in the vertical ribs 270 to be larger than the diameter of the shoulder nubs 260; and sizing the hole 269 to be larger than the thickness of the electrical connector 250. In the result, the connector base 252 (together with its integral electrical connector 250) is translatable, within cavity 267, between a first position as shown in FIG. 8A and a second position as shown in FIG. 8B. The rationale for the limited translatability will be described below.

Figure 9:
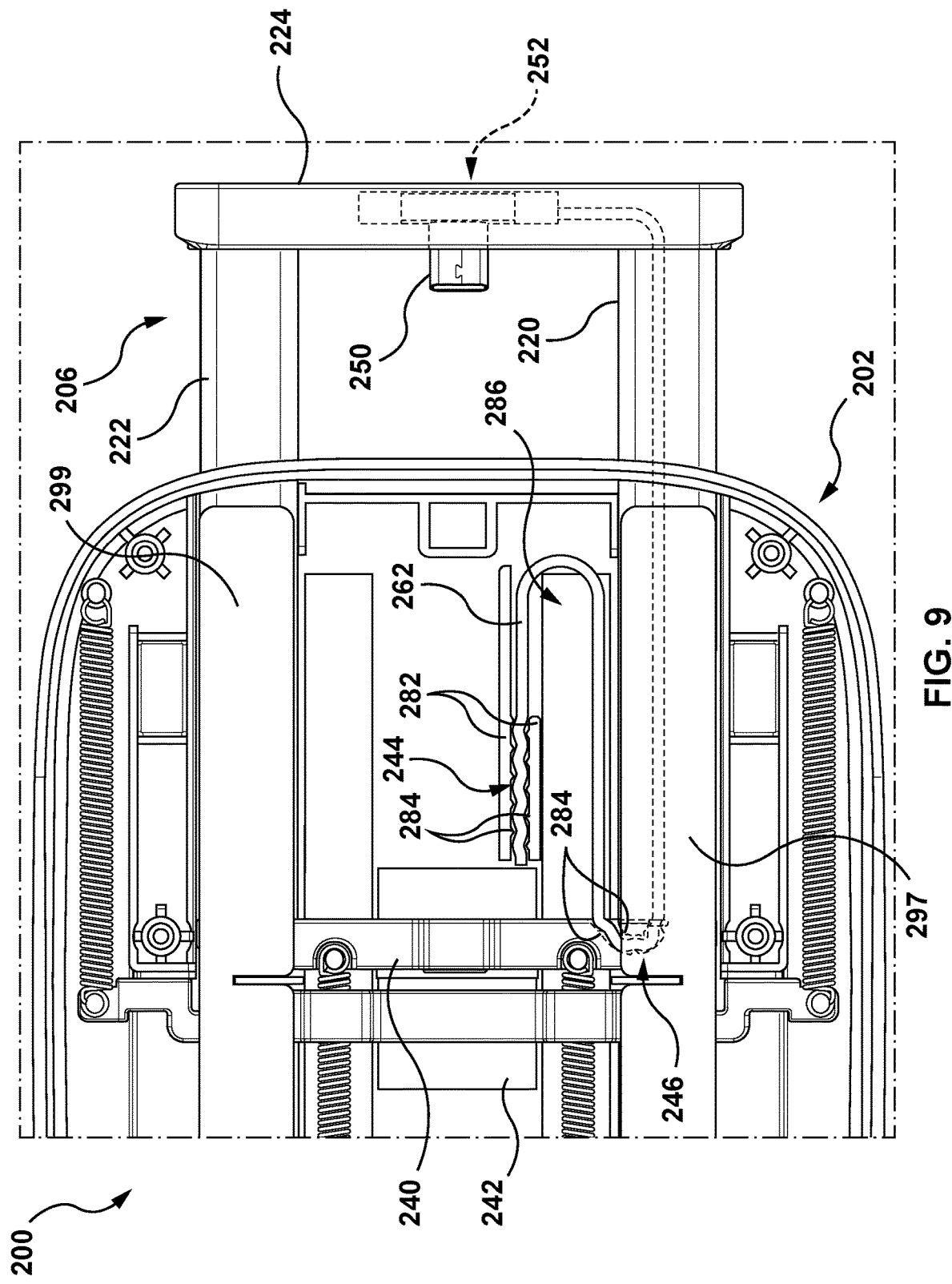
FIG. 9 is a partial top plan view of the mobile device mount of FIG. 1 with a top and an inner cover component of a body of the mobile device mount removed.

FIG. 9 is a partial top plan view of the mobile device mount 200 with the top 208 and an inner cover 209 (FIG. 3) omitted to reveal internal components housed within the body 202. As illustrated, the insulated cable 262 electrically couples the PCB 242 with the electrical connector 250 in the clamp arm 206. The cable 262 is anchored at two points by cable anchors 244 and 246 respectively.

The first cable anchor 244 is a straight crimping channel near the PCB 242. This cable anchor 244 is formed by two parallel walls 282 fixed to the floor 203 of body 202. A first portion of the electrical cable 262 is removably wedged or crimped between the walls 282 to thereby anchor that portion of the cable relative to the body 202. In the illustrated embodiment, the cable anchor 244 has opposed, offset, inwardly pointing teeth 284 to enhance crimping of the cable 262, e.g., via increased friction with, or pinching of, the cable's external insulation.

The second cable anchor 246 is a curved crimping channel in the crosspiece 240 of clamp arm 206. This cable anchor 246 also has opposed, offset, inwardly pointing teeth 284 for similar reasons as cable anchor 244. The second cable anchor 246 is used to anchor a second portion of the cable 262 relative to the clamp arm 206.

Between the two cable anchors 244 and 246, sufficient slack in the cable permits movement of the clamp arm 206, relative to the body 202, from the default retracted position to an extended position for clamping the edge of a mobile device, as described below. The slack in the cable is accommodated within a hollow 286 inside the body 202. The slack in the cable 262 is sufficient for unrestricted movement of the clamp arm 206, relative to the body 202, between the default retracted position of the clamp arm and an extended position of the clamp arm, e.g., as depicted in FIG. 14 (described below)

Collectively, the two cable anchors 244, 246 and slackened cable 262 promote reliability of electrical connectivity between the PCB 242 and the electrical connector 250. In particular, these features limit a risk of any tensile force that may be applied to the cable 262 will reach, and possibly damage, electrical connections between the cable 262 and the PCB 242 and/or the electrical connector 250 during clamp arm extension and retraction.

From cable anchor 246, the electrical cable 262 is threaded through a hollow interior of arm member 220 and through internal passages in the crosspiece 224 to the electrical connector 250 via connector base 252. As such, the cable 262 is fully enclosed within the mobile device mount 200 in the present embodiment. This provides a clean aesthetic appearance and reduces the risk of external cable snagging.

FIGS. 10-14 are side elevation views of the mobile device mount 200 of FIG. 1 during various stages of mounting of an example mobile device 300 by a user. In this example, the mobile device 300 is a tablet computing device having a USB-C receptacle 302 (female) in its lower edge surface 304. The mounting shown in FIGS. 10-15 may for example be performed with the mobile device mount 200 sitting on a horizontal flat surface, such as a tabletop.

Referring to FIG. 10, the mobile device 300 may initially be held at a declined angle similar or identical to the natural (default) inclination angle J of the electrical connector 250 (see FIG. 5). With the receptacle 302 aligned with electrical connector 250, the edge surface 304 of the mobile device 300 may then be moved towards the crosspiece 224 of clamp arm 206 as shown in FIG. 10.

Referring to FIG. 11, the electrical connector 250 has been inserted into the receptacle 302. It will be appreciated that, in view of the natural inclination of the electrical connector 250 and the declined orientation of the mobile device 300 during this stage of mounting, angular alignment between electrical connector 250 and the electrical receptacle may be promoted. This may prevent or limit undesirable torquing of the electrical connector 250 during the mating of the electrical connector 250 with the receptacle 302. When the edge surface 304 of the mobile device 300 abuts the clamping surface 226 of the crosspiece 224 (as in FIG. 11), any further force applied to the mobile device 300 in that direction may cause the clamp arm 206 to extend away from the body 202. This is depicted in FIG. 11 by a rightward facing arrow.

Figure 12:
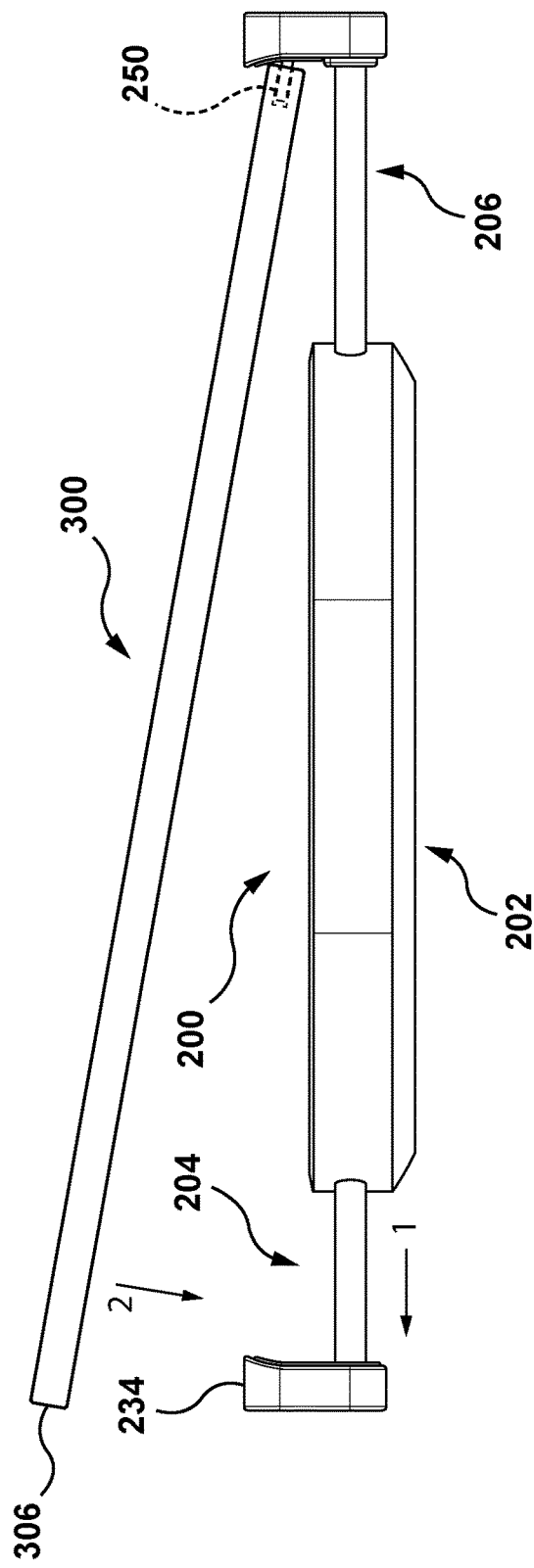

Referring to FIG. 12, the clamp arm 206 has been partially extended by virtue of the applied force described immediately above. At this stage, the user may manually pull the other clamp arm 204 outwardly away from the body 202, as depicted at arrow #1 of FIG. 12. Once the crosspiece 234 of the clamp arm 204 is clear of the top edge surface 306 of mobile device 300 (as in FIG. 13, described below), the edge surface 306 may be lowered, as depicted by arrow #2 of FIG. 12. It will be appreciated that the pivotability of the electrical connector 250 relative to the clamp arm 206, as described above, will tend to limit undesirable torquing or damage to the inserted electrical connector 250 during the lowering of edge surface 306, i.e., during the pivoting of the mobile device 300 relative to the clamp arm 206. The electrical cable 262 may twist slightly, e.g., between arm member 220 and shoulder nub 260, during any such pivoting. Such twisting may be achieved without compromising electrical connectivity.

Figure 13:
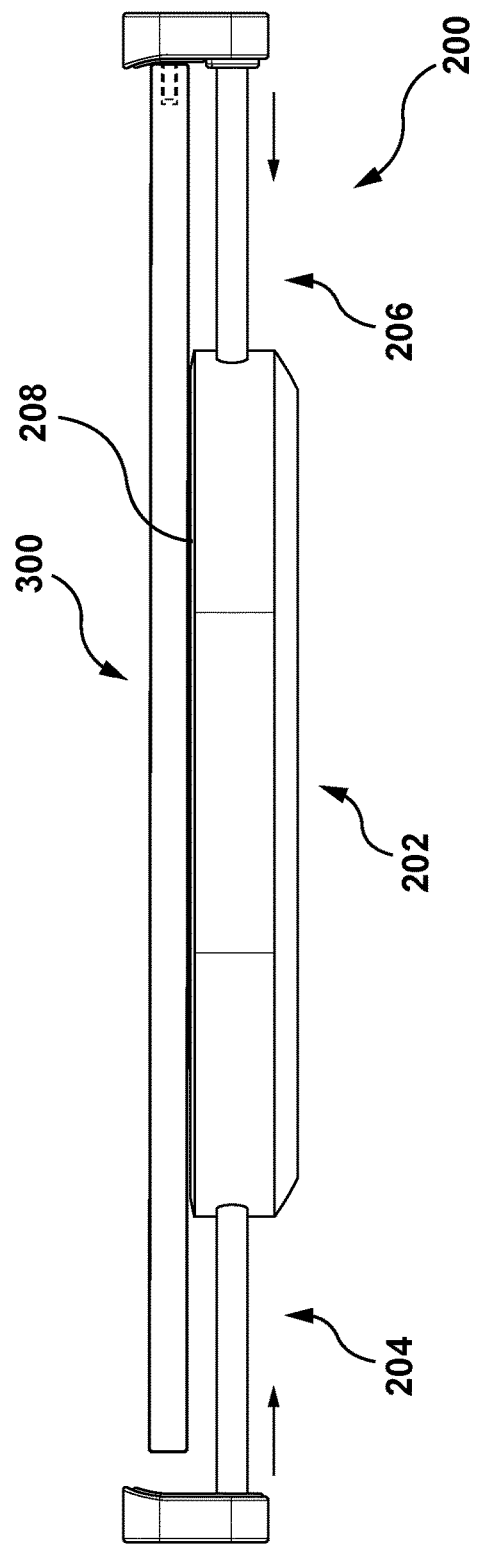

Referring to FIG. 13, once the mobile device 300 has been lowered so as to be substantially level relative to the body 202 (here, parallel with top 208), the user may reduce outward manual tension upon the clamp arm 204. Tension from the springs S1 may then cause the clamp arm 204 to begin to retract, as depicted by the rightward pointing arrow in FIG. 13.

Referring to FIG. 14, when the clamping surface 236 of the clamp arm 204 engages the top edge surface 306 of the mobile device 300, and with the clamping surface 226 of clamp arm 206 continuing to engage the opposite bottom edge surface 304, the mobile device 300 will be clamped from either side and will be substantially fixed relative to the mobile device mount 200. In this state, the mobile device 300 is said to be "mounted" in the mobile device mount 200, and the mobile device 300 and mount 200 may conveniently be carried as a unit. For this reason, the mobile device mount 200 may be considered as a "caddy" for the mobile device 300.

In FIG. 14, the separation distance between the crosspieces 224 and 234 of clamp arms 206 and 204 respectively will be D2, i.e., the lengthwise (or widthwise) extent of the mobile device 300, where D2 is larger than D1 (FIG. 1).

Figure 15:
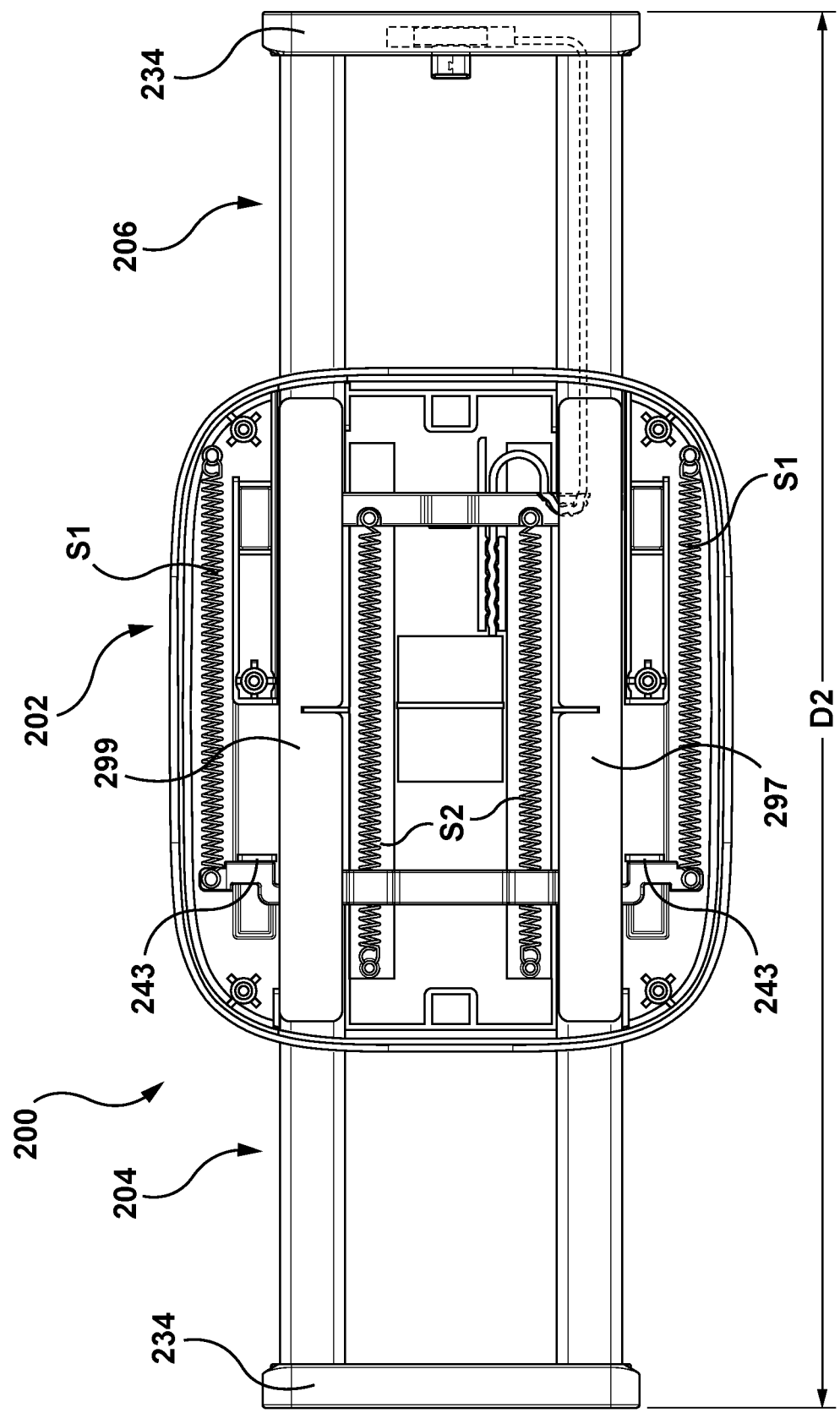
FIG. 15 is a top plan view depicting the state of internal components of the mobile device mount when a mobile device is mounted therein.

FIG. 15 is a top plan view depicting the state of internal components of the mobile device mount 200 when the mobile device 300 is being clamped (held) as shown in FIG. 14. In FIG. 15, the top 208 and inner cover 209 of the body 202 have been removed to reveal internal components.

Due to the substantially equal and opposite forces applied by the stretched springs S1 and S2 biasing clamp arms 204 and 206 respectively in the present embodiment, each clamp arm 204 and 206 will extend from body 202 by substantially the same amount when the mobile device 300 is being held. As a result, the clamped mobile device 300 will tend to be centered with respect to the body 202 in the dimension of clamp arm extension. This may help to keep the center of gravity of the mobile device 300 generally centered with respect to the body 202, at least in the dimension of clamp arm extension. That in turn may help to limit the risk that the powered stand will topple when the mobile device mount 200 is seated thereupon.

Figure 16:
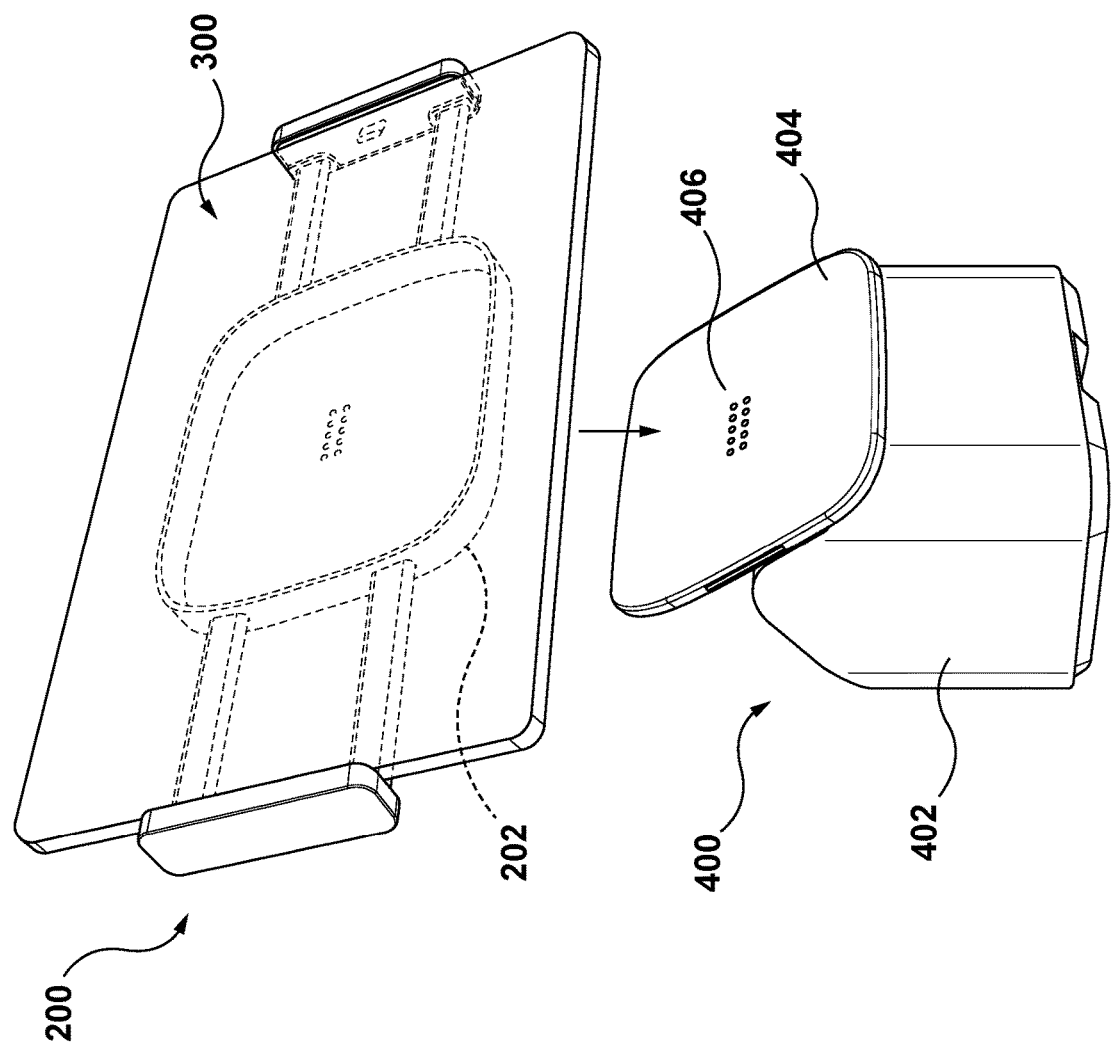
FIG. 16 is a perspective view of the mobile device mount with a mounted mobile device being seated onto an example powered stand.

FIG. 16 depicts, in perspective view, the seating of the mobile device mount 200 with clamped mobile device 300 onto an example powered stand 400. The powered stand 400 has a house-shaped base 402 with a slab-like pivotable dock 404. The dock is shaped to fit just within the downwardly protruding lip 214 on the underside of the body of the mobile device mount 200 (see FIG. 2). The dock 404 has a centrally disposed row of five electrical contacts 406. The contacts 406 are outwardly resiliently biased so as to protrude slightly from a surface of the dock 404.

When the mobile device mount 200 with clamped mobile device 300 is lowered onto the stand 400, the body 202 may be seated onto the dock 404 so as to be received within the recess formed by peripheral lip 214. Seating may be facilitated by magnetic forces between one or more complementary magnets in the dock 404 and body 202.

It will be appreciated that the positioning of the rows 218A and 218B of contacts (FIG. 2) is such that, depending upon the orientation of the body 202 with respect to the dock 404 when the former is seated upon the latter, one of the two rows of contacts 218A or 218B will be properly aligned to establish electrical connectivity with the single row of contacts 406 in the dock. This design contemplates the possibility that, due to the general bilateral symmetry of the mobile device mount 200 holding a mobile device 300 (and because user interfaces on a mobile device often auto-orient based on device orientation, e.g., as detected by an accelerometer in the mobile device), a user may inadvertently seat the mobile device mount 200 onto to the stand in an inverted state. In this context, "inverted" means rotated by 180 degrees without changing the direction in which the clamped mobile device faces. To permit a proper connection to be established regardless of any such possible 180-degree rotation, the five contacts of row 218A are ordered in reverse order from those of row 218B.

It may be desired to mount other types, makes, and models of mobile device into the mobile device mount 200 besides the example mobile device 300. It is possible that the position of the electrical receptacle within the edge surface of the mobile device, relative to a rear surface of the mobile device (which will lay upon the top 208 of body 202), will vary as between mobile devices. In the embodiment depicted in FIGS. 1-15, the electrical connector 250 is translatable to a limited extent T in the Z dimension, as described above in connection with FIG. 4. This may facilitate alignment of the electrical connector 250 with the electrical receptacle of whatever mobile device may be mounted in the mobile device mount 200. As a result, the application of stress or force upon the electrical connector 250 may be limited, e.g., in comparison to an electrical connector that is not translatable in this manner. Such translatability is not necessarily provided in all embodiments. For example, a mobile device mount that is intended for use with only one type or model of mobile device may not warrant such limited translatability of its electrical connector.

Various alternative embodiments are possible.

In some embodiments, the electrical cable electrically coupling the PCB with the electrical connector in the clamp arm may not be fully enclosed by the mobile device mount. For example, instead of having a hollow arm member 220 through which the cable 262 is threaded as shown in FIG. 9, the clamp arm may have a different type of arm member, e.g., diecast, with a longitudinal channel defined therein. The cable may be tucked into the open channel, possibly being visible from the exterior of the mobile device mount. The remaining features of such embodiments may be as described above, e.g., in respect of the resilient biasing mechanism of the clamp arms 204 and 206, the structure of the electrical connector 250 and connector base 252, and the way in which the default inclination of the electrical connector 250 is achieved.

Some embodiments may omit cable anchors 244, 246 inside the body 202 of the mobile device mount 200 or may use alternative forms of cable anchors, such as an adhesive or removable fastener. The remaining features of such embodiments may be as described above, e.g., in respect of the resilient biasing mechanism of the clamp arms 204 and 206, the structure of the clamp arms 204 and 206, the electrical connector 250 and connector base 252, and the way in which the default inclination of the electrical connector 250 is achieved.

In some embodiments, electrical connector is not mounted within a cavity 267. Rather, the electrical connector may be part of a solid body that itself is pivotable. The remaining features of such embodiments may be as described above, e.g., in respect of the resilient biasing mechanism of the clamp arms 204 and 206.

What is claimed is:

1. A universal mobile computing device mount comprising:
    a body;
    a clamp arm slidably engaged with the body for slidable translation between an extended position and retracted position, the clamp arm connected to a biasing mechanism inwardly biasing the clamp arm toward the retracted position and wherein the clamp arm is configured to engage an edge surface of a mobile computing device; and
    an insertable electrical connector pivotably mounted in the clamp arm, the electrical connector being pivotable relative to the clamp arm to promote angular alignment of the electrical connector with a complementary electrical receptacle in the edge surface of the mobile computing device during mounting of the mobile computing device into the universal mobile computing device mount.

2. The universal mobile computing device mount of claim 1 wherein the electrical connector is configured to have a default inclination relative to the body when no mobile computing device is mounted in the mobile computing device mount.

3. The universal mobile computing device mount of claim 1 further comprising a cavity in the clamp arm within which the electrical connector is pivotably mounted to the clamp arm, the cavity being configured to permit limited translation of the electrical connector relative to the clamp arm in a translation direction.

4. The universal mobile computing device mount of claim 3 wherein the translation direction is orthogonal to both an axis of pivotability of the electrical connector and a direction of biasing of the clamp arm towards the body.

5. The universal mobile computing device mount of claim 4 further comprising:
    a connector base integrally formed with the electrical connector, the connector base comprising a body and a coaxial pair of shoulder nubs protruding from either side of the body of the connector base, the connector base being sized to fit within the cavity; and
    a pair of supports at opposite sides of the cavity in the clamp arm, the pair of supports being usable as a fulcrum for pivotably engaging the pair of shoulder nubs during the pivoting of the electrical connector relative to the clamp arm.

6. The universal mobile computing device mount of claim 5 wherein the body of the connector base is tapered away from the shoulder nubs.

7. The universal mobile computing device mount of claim 1 further comprising:
    a set of electrical contacts in the body for relaying electrical signals between the mobile computing device and a powered stand; and
    at least one electrical conductor electrically coupling the set of electrical contacts in the body with the electrical connector in the clamp arm.

8. The universal mobile computing device mount of claim 7 wherein a portion of the at least one electrical conductor is tucked into an open channel in the clamp arm.

9. The universal mobile computing device mount of claim 7 wherein a portion of the at least one electrical conductor is threaded through a hollow internal passage of the clamp arm.

10. The universal mobile computing device mount of claim 7 wherein the at least one electrical conductor is fully enclosed by the body and the clamp arm collectively.

11. The universal mobile computing device mount of claim 7 wherein the at least one electrical conductor comprises a cable and further comprising:
    a first cable anchor configured to fix a first portion of the cable to the body;
    a second cable anchor configured to fix a second portion of the cable to the clamp arm; and
    a hollow within the body for accommodating slack in the cable between the first and second portions of the cable when fixed by the first and second cable anchors respectively,
    wherein the slack in the cable is sufficient for unrestricted movement of the clamp arm, relative to the body, between a default retracted position of the clamp arm and an extended position of the clamp arm.

12. The universal mobile computing device mount of claim 11 wherein each of the first and second cable anchors is a cable crimping channel.

13. The universal mobile computing device mount of claim 12 wherein the cable crimping channel has opposed, offset, inwardly pointing teeth.

14. The universal mobile computing device mount of claim 1 wherein the clamp arm is a first clamp arm, wherein the edge surface of the mobile computing device is a first edge surface, and further comprising a second clamp slidably engaged with the body for slidable translation between an extended position and retracted position, the clamp arm connected to a biasing mechanism inwardly biasing the clamp arm toward the retracted position, and the second clamp arm being located on an opposite side of the body as the first clamp arm, the second clamp arm being configured to engage a second edge surface of the mobile computing device, the second edge surface being opposite from the first edge surface of the mobile computing device.

15. The universal mobile computing device mount of claim 14 wherein the biasing mechanism connected to the first clamp arm and the biasing mechanism connected to the second clamp arm each generate a substantially similar magnitude of resilient biasing force to promote substantial centering of a mounted mobile computing device relative to the body in a dimension of clamp arm extensibility.

16. The universal mobile computing device mount of claim 1 wherein the insertable connector is a Universal Serial Bus type C connector.

17. The universal mobile computing device mount of claim 1, wherein the biasing mechanism includes one or more springs.

18. The universal mobile computing device mount of claim 14, wherein the biasing mechanism connected to the first clamp arm and the biasing mechanism connected to the second claim arm each include one or more springs.

\* \* \* \* \*